Figure 1:
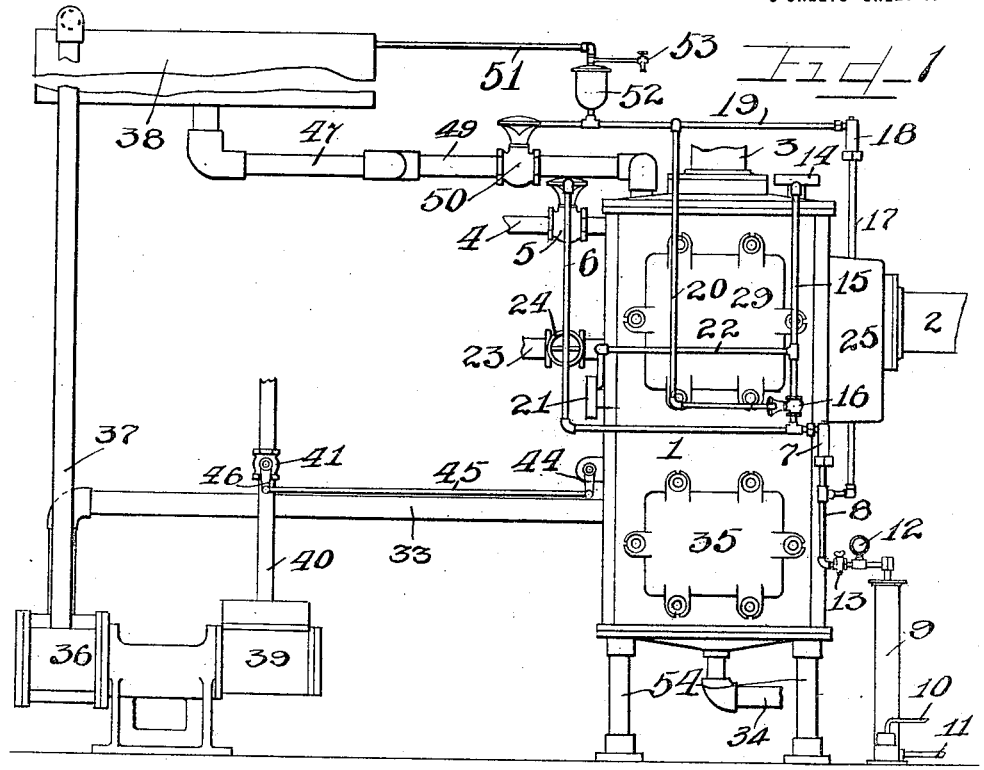

O. J. DILLIN.
AUTOMATICALLY CONTROLLED WATER HEATER.
APPLICATION FILED AUG. 14, 1914.

1,214,656.  Patented Feb. 6, 1917.
5 SHEETS—SHEET 1.

O. J. DILLIN.
AUTOMATICALLY CONTROLLED WATER HEATER.
APPLICATION FILED AUG. 14, 1914.
1,214,656.
Patented Feb. 6, 1917.
5 SHEETS—SHEET 2.
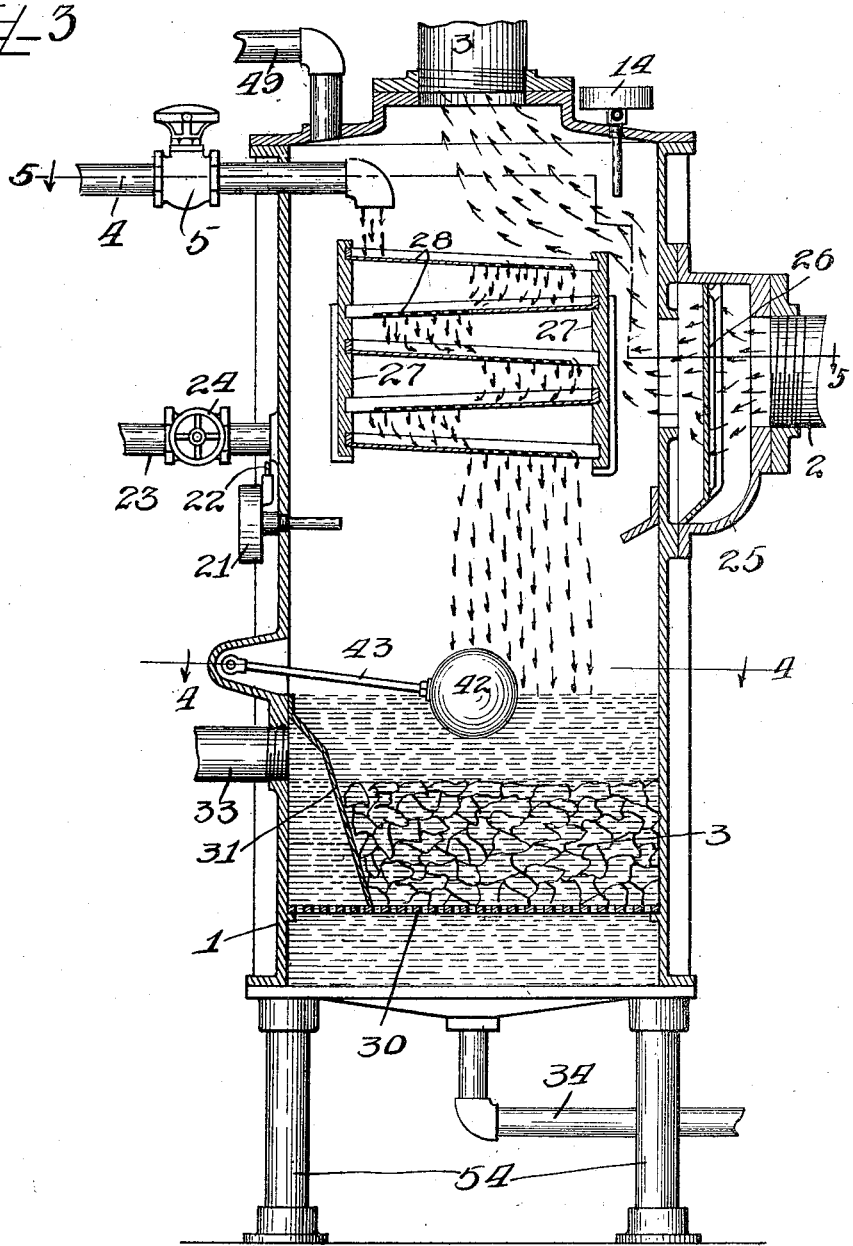

O. J. DILLIN.
AUTOMATICALLY CONTROLLED WATER HEATER.
APPLICATION FILED AUG. 14, 1914.
1,214,656.  Patented Feb. 6, 1917.
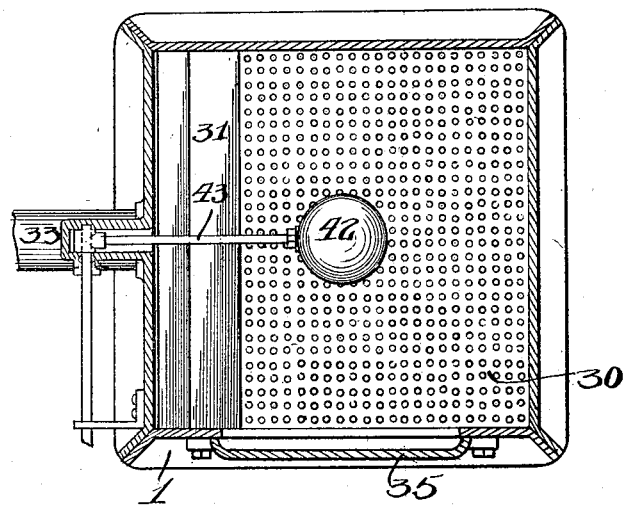
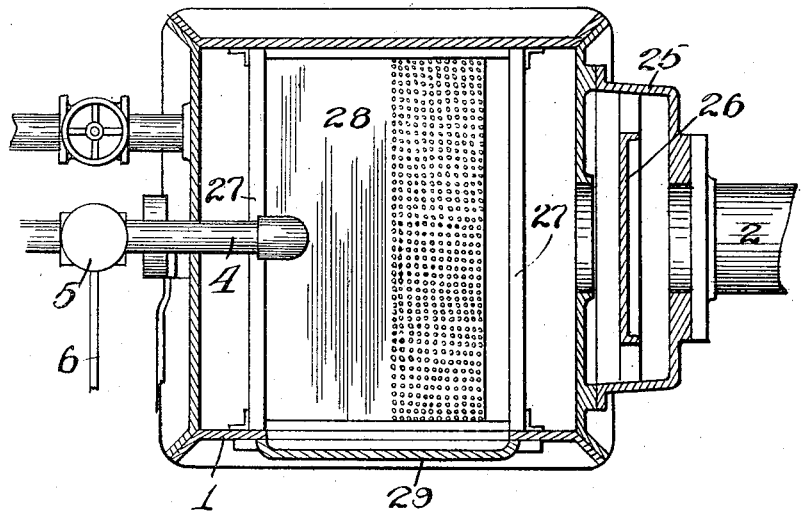

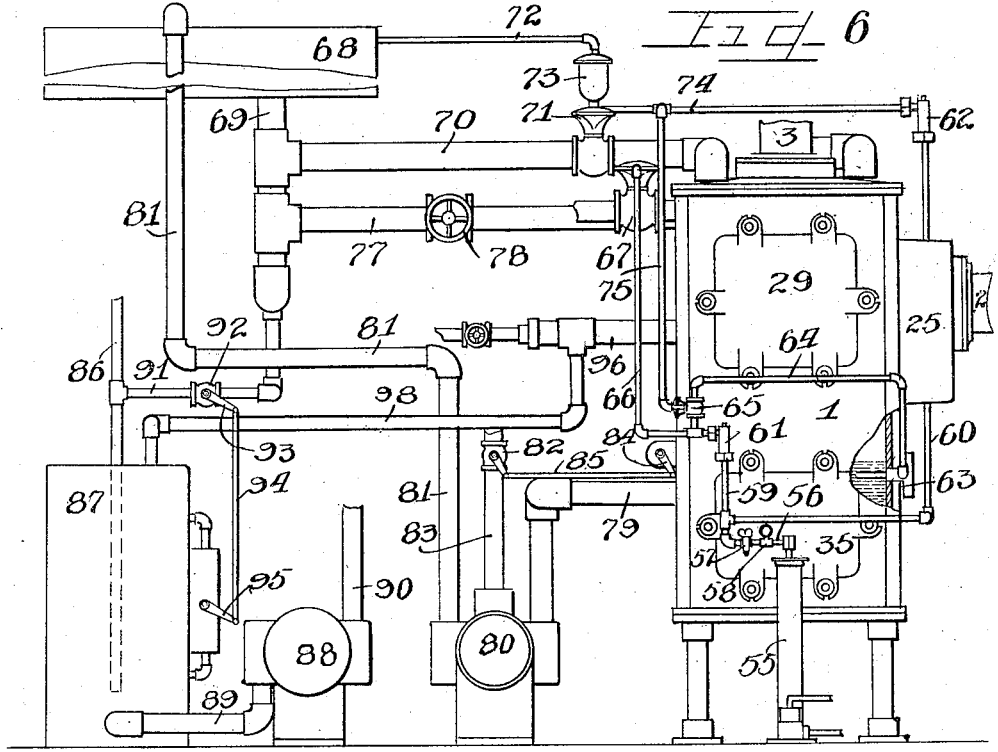
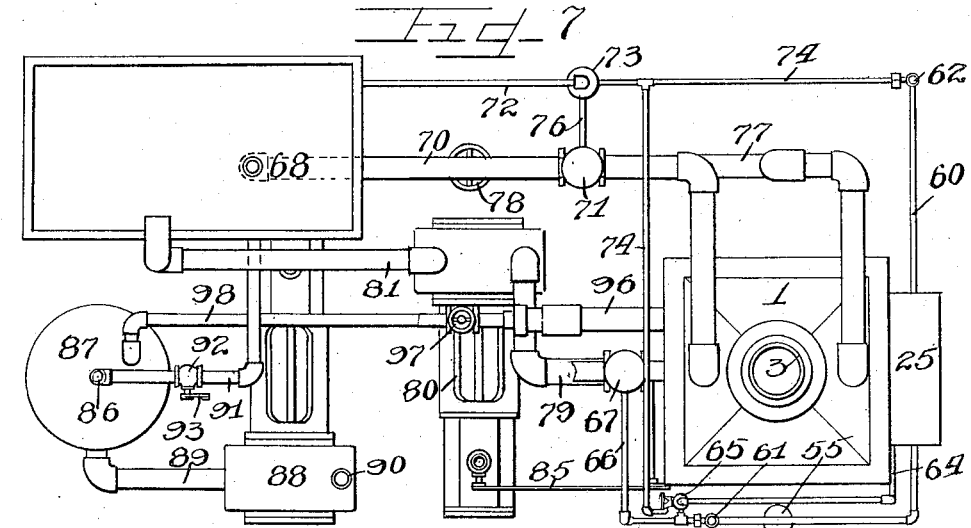

O. J. DILLIN.
AUTOMATICALLY CONTROLLED WATER HEATER.
APPLICATION FILED AUG. 14, 1914.
1,214,656.     Patented Feb. 6, 1917.
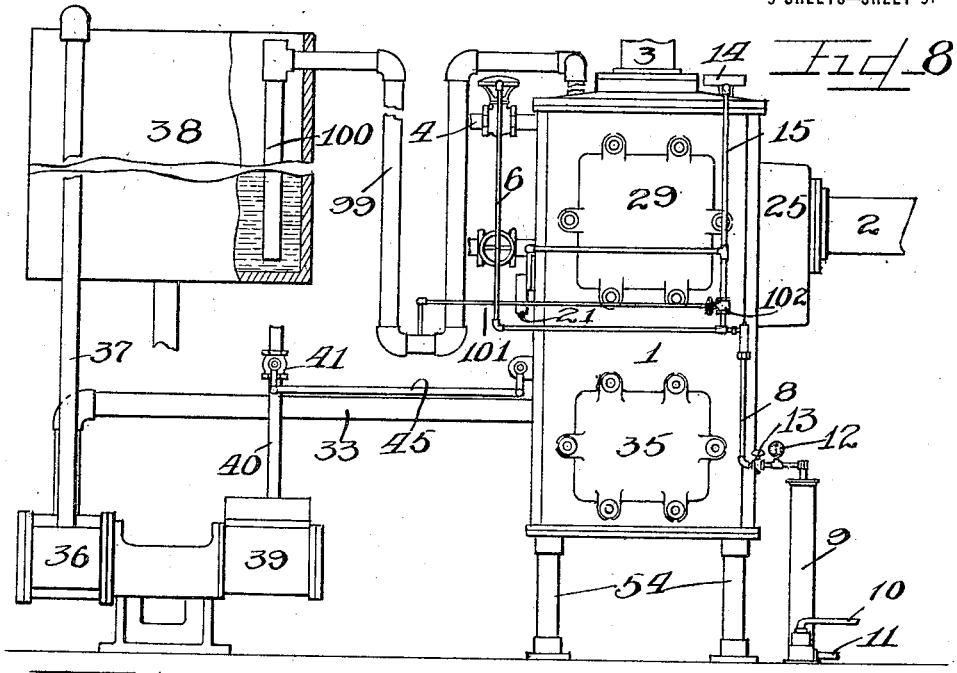
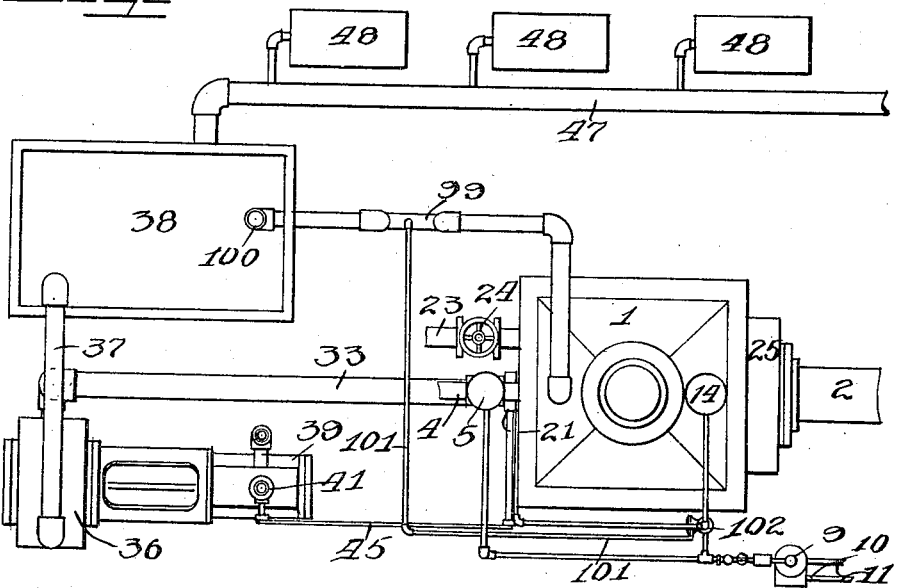

UNITED STATES PATENT OFFICE.

OBIE J. DILLIN, OF CHICAGO, ILLINOIS.

AUTOMATICALLY-CONTROLLED WATER-HEATER.

1,214,656.   Specification of Letters Patent.   Patented Feb. 6, 1917.

Application filed August 14, 1914.   Serial No. 856,725.

*To all whom it may concern:*

Be it known that I, OBIE J. DILLIN, a citizen of the United States, and a resident of the city of Chicago, in the county of Cook and State of Illinois, have invented certain new and useful Improvements in Automatically - Controlled Water - Heaters; and I do hereby declare that the following is a full, clear, and exact description of the same, reference being had to the accompanying drawings, and to the numerals of reference marked thereon, which form a part of this specification.

This invention relates to that class of devices for utilizing the heat of exhaust steam in heating water to a certain predetermined temperature, so that the hot water may be used for any purpose, or, if desired, returned to the boiler.

Oftentimes in manufacturing plants or in other industries it is desirable to use water at a certain fixed temperature, and consequently controlling means are provided governing the operation so that at times all of the available heat of the exhaust steam is not utilized and at other times the quantity of flow of water into the heating means is changed. In the system I have devised, the water which has been heated to the proper temperature by the exhaust steam, is pumped to a suitable reservoir from which it may be drawn off from time to time as desired. Thermostatic means are provided for controlling the flow of cold water into the system, and the discharge of water from the heater to said reservoir, and also for permitting an excess or overflow quantity of water from the reservoir to circulate again through the heating means, so that no heated water is wasted by discharge from the system.

It is an object of this invention to construct an exhaust steam heating system for water whereby cold entering water is caused to traverse a tortuous path in the field of flow of exhaust steam, which imparts its heat to the water, raising the temperature of the water to a predetermined degree.

It is also an object of this invention to construct a heating system for water utilizing exhaust steam, whereby the quantity of flow of water in the system is controlled thermostatically to insure the water being heated to a predetermined temperature.

It is also an object of this invention to construct a heating system for water wherein cold water is introduced into an open heater and subjected to the action of exhaust steam, the water then passing through suitable filtering means and through an outlet, the inlet for the water being thermostatically controlled in order to prevent the temperature of water from falling below a certain point.

It is also an object of this invention to construct a heating system for water wherein the water is introduced into the field of flow of exhaust steam and subjected to the action thereof, receiving the heat therefrom and then being pumped to a suitable reservoir from which it may be drawn from time to time for use as desired, but with mechanisms for controlling the quantity of flow of the water to insure a constant temperature of the heated water irrespective of variations in the amount or temperature of the steam or the quantities of water drawn from the reservoir for use.

It is furthermore an important object of this invention to construct a water heating and reservoir system wherein the heat of exhaust steam is utilized in heating the water, the surplus exhaust steam then passing to the open air or to a heating system for the building or to any other suitable mechanism wherein it may be utilized.

It is finally an object of this invention to construct a simplified automatically acting and thermostatically controlled exhaust steam heating system for water, wherein means are provided to heat the water to a predetermined temperature.

The invention (in a preferred form) is illustrated in the drawings and hereinafter more fully described.

Figure 2:
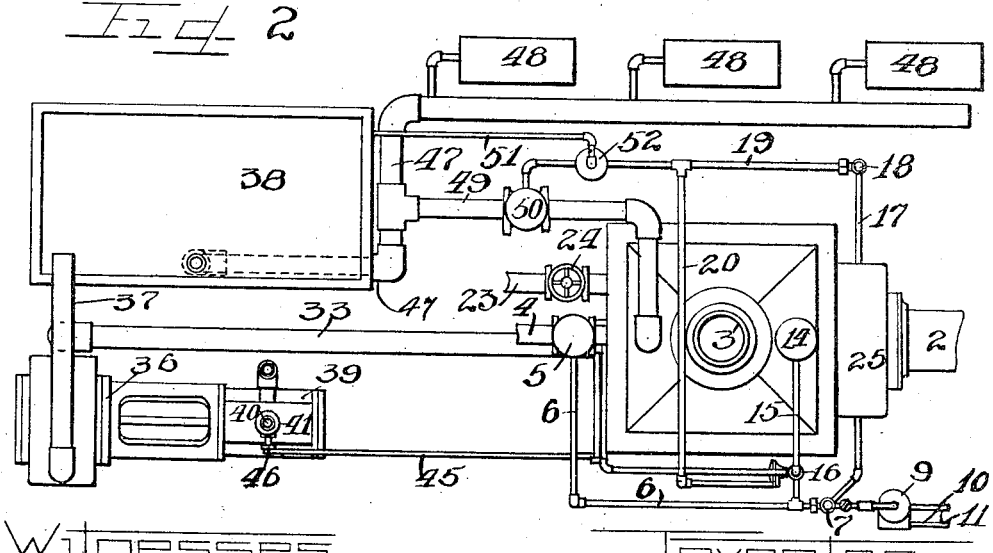

In the drawings, Figure 1 is an elevation, partly broken away of a system embodying the principles of my invention. Fig. 2 is a top plan view thereof. Fig. 3 is a central vertical section with parts in elevation, taken through the heater of the system. Fig. 4 is a section taken on line 4—4 of Fig. 3. Fig. 5 is a section taken on line 5—5 of Fig. 3. Fig. 6 is a side elevation of a modified form showing a different arrangement of parts. Fig. 7 is a top plan view thereof. Fig. 8 is a front elevation of another modification. Fig. 9 is a top plan view thereof.

As shown in the drawings, referring first to Figs. 1 to 5 inclusive, the heating element for the water is denoted as a whole by the reference numeral 1, with an inlet 2, for exhaust steam on one side thereof and at the top an outlet 3, for passage of the excess steam leaving the system. A cold water supply pipe 4, communicates in one side near the upper end of said heater, and the flow therethrough is controlled by a diaphragm actuated valve 5, and said valve is connected to a pipe 6, which leads downwardly and on one side of the heater and is connected to a restriction valve 7, mounted in the main pipe line 8, of a compressed air supply. The air is compressed by a small vertical hydraulic air compressor 9, the inlet and outlet water pipes of which are denoted respectively by the reference numerals 10 and 11, the main pipe line of which is provided with a gage 12, and a stop cock 13, the latter controlling the flow through the pipe line 8. A thermostat 14, is connected through the top of the heater 1, adjacent said outlet 3, and controls the flow through an air release pipe line 15, which is connected to the pipe line 6, adjacent the restriction valve 7. Connected with said pipe 15 is an air release diaphragm valve 16 with which is connected a pipe 20 hereinafter described, the pressure in said pipe normally maintaining said valve 16 closed, it being understood that said valve in no way interferes with the free passage of air from the pipe 6 through pipe 15 to the thermostat 14. Another pipe line 17, communicates with the main pipe line 8, and is provided with a restriction valve 18, at its upper end, which in turn is connected to a pipe line 19, said pipe 19, communicating with the pipe 20, which controls said valve 16, as hereinbefore described. Another thermostat 21, connected in the side of the heater 1, slightly above the normal water level therewithin, and provided with an air release pipe line 22, is connected with said thermostat 14, and the pipe 15, already mentioned. A pipe 23, for live steam, provided with a normally closed hand valve 24, also extends through the side of said heater for the purpose of introducing live steam thereinto at any time when so desired, as for instance, in effecting a preliminary heating of the device, or for the purpose of cleaning the same.

Arranged on the heater 1, and over the inlet steam pipe 2, is an oil separator 25, which, as clearly shown in Fig. 3, is provided with baffles 26, on which the oil is projected as the entering exhaust steam is deflected therearound, and of course, suitable drips (not shown) may be connected in the lower portion of said separator for draining the same of the collected oil. Arranged transversely within said heater are vertical parallel partitions 27, which are provided with guides or ways to receive trays 28, therein, in inclined position, the lower portion of each of said trays being perforated to permit the water to traverse a tortuous path from one tray to the other after it enters the heater, as shown by the arrows in Fig. 3. A removable wall plate 29, is bolted on the side of the heater 1, in order to afford access to said trays for the purpose of removing and cleaning the same, inasmuch as they soon become coated with scale and sediment introduced into the heater by the entering cold water.

Extending horizontally across the lower end of the heater is a perforated floor or partition 30, and another inclined partition wall 31, is rigidly secured to one side of said heater and to said partition floor 30, permitting a quantity of coke or other filtering material 32, to be placed thereon, so that the water falling from the trays filters therethrough, and upwardly beneath said partition 31, and may then be drawn off through an outlet 33, provided for the purpose. A blow-off pipe 34, is connected in the bottom of said heater to drain the same, and to permit removal of filtering material 32, I provide a removable wall plate 35, bolted on the side of a heater. Said outlet pipe 33, for the purified and heated water, communicates with the water cylinder 36, of a steam pump, and a discharge pipe 37, also communicates therewith and with a reservoir 38, mounted at any convenient point, preferably elevated above the rest of the system. The steam cylinder 39, of said pump receives steam through a suitable steam supply pipe 40, provided with a valve 41, and mechanisms are provided to vary the opening of said valve 41, dependent upon the height of the level of the fluid within the heater. For this purpose a ball float 42, on an arm 43, is pivoted in an extension in the side wall of said casing, and said arm is rigidly connected on the exterior of the heater with a crank 44, which is connected by means of a link 45, with an actuating lever 46, for said valve 41.

The reservoir 38, is provided with an eduction pipe 47, through which the water may be drawn off and used in suitable washers or other devices 48, connected thereto, as clearly shown in Fig. 2. A pipe 49, is connected in the eduction pipe 47, and also with the heater 1, and is provided with a normally closed diaphragm controlled valve 50, the diaphragm thereof being connected to the pipe 19, already described.

An overflow or spill pipe 51, is connected in the upper end of the reservoir 38, and leads downwardly and into a pressure chamber 52, which controls a release valve in said pipe line 19 and a small feeder pipe and pet cock 53, are connected with said pipe 51, to drain the same. For convenience of illustration I have shown the heater supported upon legs 54, but of course said heater may be mounted in any suitable or convenient manner preferred.

In the modification of my invention illustrated in Figs. 6 and 7, the construction of the heater is identical with that already described, but the thermostatically controlled valve connections thereto and pipe arrangement is slightly different. A hydraulic air compressor 55, is mounted in front of the heater, and connected with said compressor is the main air supply line 56, provided with a stop cock 57, and a gage 58. Said main air supply line 56, branches at a T, one branch being denoted by the reference numeral 59, and the other by the reference numeral 60, and each branch communicates with a restriction valve, which are denoted respectively by the reference numerals 61 and 62. A thermostat 63, is connected in the side of the heater 1, and communicates through a pipe 64, and a normally open diaphragm valve 65, with said restriction valve 61. Another pipe 66, is also connected with said restriction valve 61, and communicates with a diaphragm valve 67, which controls the inlet of cold water to the heater. Similar to the construction already described, a reservoir 68, is provided, the outlet 69, from which communicates through a pipe 70, with the interior of the heater 1, and is provided with a normally closed diaphragm controlled valve 71. A spill or overflow pipe 72, communicates with the upper end of the reservoir 68, and also with a pressure cylinder 73, having an air release valve therein connected to a pipe 74, which is also connected to the restriction valve 62, so that when said valve in said pressure cylinder is opened, the pressure in the pipe 74, is released. Connected to said pipe 74, is another pipe 75, leading to the diaphragm controlled valve 65, and also a short pipe 76, connects said pipe 74 with the diaphragm valve 71, so that when the pressure in said pipe 74, is released, the valve 71, is opened, and the valve 65, is closed. Another pipe 77, connects the eduction pipe 69, of the reservoir with the heater 1, and is provided with a normally closed hand operated valve 78, so that draining the reservoir through the heater may be readily performed by merely opening said valve 78.

The heated water is withdrawn from the heater through a pipe 79, by a steam pump 80, and elevated to the reservoir through a pipe 81, in the manner already described with reference to the previous construction. A valve 82 in a pipe 83 controls the steam supply to the said pump 80. The valve 82 is operated through the lever 84 and link 85, by a float within the heater, so that the live steam flowing to the pump is cut off when the level of the water in the heater falls below a certain amount.

Where this installation is used in combination with a heating system for a building, the returns from the heating elements or radiators lead through a pipe 86, into a tank 87, and another steam pump 88, withdraws the water through a pipe 89, from said tank and pumps the same through a pipe 90, to the boiler. A pipe 91, is connected between said return line 86, and the eduction pipe 69, of the reservoir, and connected in said pipe 91, is a valve 92, having an actuating lever 93, which is connected by means of a link 94, with a lever 95, which moves with a float mounted within the tank 87, similar to the construction described with reference to the float 42. Thus when the level of the water in said tank 87, falls below a certain point, said valve 92, is opened, and the water flows from the reservoir 68 into the tank 87. A live steam pipe 96, enters the side of the heater, similar to the construction already described, and is provided with a valve 97, and connected to said live steam supply pipe is a pipe 98, which communicates with said tank 87.

In the modification of my device illustrated in Figs. 8 and 9, I have shown piping connections substantially identical with those described with reference to Figs. 1 to 5 inclusive, with the exception that connected with the reservoir 38, I have shown a U-pipe 99, which communicates at one end with a pipe 100, within the reservoir projecting downwardly to near the bottom thereof, and at the other end into the upper portion of the heater 1. The thermostatically controlled valves are disposed in a manner exactly similar to the construction described with reference to Figs. 1 to 5, but in place of the pipe 51, I have provided a pressure pipe 101, communicating with the bottom of the U-pipe 99, and connected with a diaphragm valve 102, which controls the thermostatic valve air lines leading to the respective thermostats 14 and 21.

The operation is as follows: The exhaust steam used for heating the water enters through the pipe 2, into the heater 1, passing on its way through an oil separator 25, and after sweeping through the interior of the heater, the uncondensed portion leaves by the outlet pipe 3, from which it may be led to other mechanisms, such as the heating elements within a building, or for any other purposes desired. The entering cold water flowing through the pipe 4, at the upper end of the heater, traverses a tortuous passage upon the respective trays 28, and is thus subjected to the direct action of the steam, a part of said steam condensing and imparting its latent heat to the water, raising the temperature thereof. The heated water falls to the bottom of the heater, and percolates through the filtering material, such as coke, charcoal, sand, or any other material suitable for the purpose, and then flows upwardly beneath the partition 31, and outwardly through the outlet pipe 33. The heated water from the outlet is pumped into a reservoir tank 38, preferably disposed at a higher level than the heater, by means of a steam pump, the flow of steam into the steam cylinder 39, of which is controlled by a valve 41, operatively connected with a float 42, within the heater, so that when the level of the water in the heater falls, said valve is closed.

I provide thermostatic means for maintaining the temperature of the water at a predetermined point by varying the quantity of water admitted into the device to take care of variations in the quantity or temperature of the entering exhaust steam. Accordingly, the inlet valve 5, for the cold water is actuated by an air diaphragm, which, under pressure, maintains said valve open, but when the pressure is released, permits said valve to close. The source of air pressure is the small hydraulic air compressor 9, disposed at any convenient point adjacent said heater, and connected by a pipe line 6, with the valve diaphragm to maintain the pressure thereon and hold said valve open. Two thermostats 14 and 21, one at the upper end within the heater, and the other secured in the side thereof, just above the normal water level, are connected to branch pipe lines 15 and 22, respectively, which communicate with said pipe line 6, so that in the event of the temperature for which said thermostats are set falling below a predetermined amount at either one of the points within said heater, the thermostats release the air in the pipe lines, thus permitting closure of the valve 5. The restriction valve 7, is connected in the line to prevent a rapid flow of air under pressure into said pipes 6, or 15 and 22, when the pressure therein has been released. It is also desirable to effect the opening of the air release valve 16, whereby the pressure in pipe 6 will be reduced and the valve 5 closed when the level of water in the reservoir 38 has passed beyond normal, and has overflowed through the pipe 51 into the cylinder 52, which has an air release valve associated therewith. This head of water opens said release valve, thereby releasing the pressure in the pipe lines 19 and 20 and causing the opening of the valve 16 and the consequent reduction in pressure in the pipe 6 and the closing of the valve 5. The pipe 49, which connects the outlet 47 of the reservoir 38 with the heater 1, is normally closed by a diaphragm valve 50, but when the pressure in pipe 19 is reduced, as just described, this reduction causes the opening of the valve 50. Thus a complete circuit of water through the heater 1 to reservoir 38, and the pump 36 is established, so that the excess quantity of water in the reservoir flows back into the heater. It will be understood that the reduction in pressure in pipe 19, whereby the valve 50 is opened also reduces the pressure in line 20, thereby opening valve 16 and causing the closing of valve 5, which checks the inflow of water. It will be understood that the valve 16 in no way interferes with the free communication through pipes 15 and 22 to pipe 6, thereby in no way interfering with the action of the thermostats 14 and 21, said valve 16 being a supplemental air release valve, for the purposes hereinbefore described.

In the form of my device illustrated in Figs. 6 and 7, the operation is substantially identical, except that the thermostat 63, is disposed at a point below the normal level of the water within the heater, and acts by releasing the pressure in the pipe line 64, and consequently the pipe line 66, to cause closure of the inlet cold water valve 67, when the temperature of the water within the heater drops below a predetermined amount. In the present construction, however, I have illustrated the water tank 87, connected to the returns 86, of a heating system for the building, and the feed water steam pump 88, pumps the same into the boiler of the power plant. The steam pump 80, pumps the heated water from the heater to the reservoir 68, and said reservoir is connected through its outlet pipe 69, both with the heater 1, and with the return tank 87, said connections, however, being normally closed. In the event of the water level in said tank 87, falling below a certain point a float therein, similar to the float 42, shown in Fig. 1, operates through levers 93 and 95, and the link 94, to open the valve 92, thus permitting a flow of water to take place from the reservoir 68, to said tank 87. As before, in the event of said tank 68, becoming filled beyond a predetermined point, the overflow water in the pipe 72, causes opening of the air release valve operated through a pressure valve in the cylinder 73, releasing the air in the pipe line 74, thus causing opening of the valve 71, and closure of the valve 65, which cuts out the thermostat 63, and permits a flow of water to take place from the reservoir 68, through the pipe 70, into the heater 1. The auxiliary pipe 77, is provided with a normally closed hand operated valve 78, and is used only at such times as is desired to drain the reservoir 68, of its contents into the heater, and from which the water may be passed off through the blow-off, if it is desired to drain the entire system.

Of course the amount of water pumped from the heater to the reservoir by the pump 80, is determined by the level of the water within the heater, the float therein being operatively connected to the steam valve 82, of the pump, causing closure of said valve when the level of the water of the heater lowers beyond a certain amount. The steam pipe line 96, is provided for the purpose of blowing live steam into the heater, or into the tank 87, through the pipe 98, which is connected with said steam line, at such times as is desired to effect either a preliminary heating thereof or to clean the same, but of course, during normal operation of the system the valve 97, thereof is closed.

In the construction shown in Figs. 8 and 9, I have shown a slightly different arrangement for taking care of the overflow from the reservoir 38, to effect closure of the valve which cuts out the thermostats 14 and 21, of the heater, that is, by the use of a U-pipe 99. The overflow water from the reservoir is trapped in said U-pipe, and the head of the water exerts a pressure in the pipe line 101, causing closure of the valve 102, which closes the air pipe lines 15 and 22, leading to the respective thermostats. Of course, suitable bleeder means (not shown) may be provided in said U-pipe to drain the same.

I am aware that various details of construction may be varied through a wide range without departing from the principles of this invention, and I therefore do not purpose limiting the patent granted otherwise than necessitated by the prior art.

I claim as my invention:

1. In a device of the class described, a water heater, inlets and outlets to permit a flow of water through said heater, temperature controlled mechanisms associated with said heater acting automatically to vary the quantity of inlet water to prevent the temperature of the outlet water falling below a predetermined degree, a reservoir to receive the heated water from said outlet, an overflow connection from said reservoir back into said heater, and a device for closing the inlet to said means during overflow from the reservoir and operated by said overflow.

2. In a device of the class described, a water heater, inlet and outlet pipes communicating therewith, a valve controlling the flow of water into said heater, thermostatic means associated with said heater and operatively connected with said valve to vary the opening thereof to limit the inflow of water to said water heater, a reservoir connected to said heater adapted to receive the water therefrom, an overflow connection between said reservoir and said heater, and means operated automatically by the overflow of said reservoir to close said valve for inlet flow of water into the heater.

3. In a water heating system of the class described, a water heater, a valve controlling the inlet of water thereto, inlet and outlet passages for steam for said heater, thermostatic means connected in said heater connected to actuate said inlet water valve, a reservoir for the heated water, a pump for pumping the water from the heater to said reservoir, piping connections between said pump, said reservoir and said heater, operative connections between said heater and said pump whereby with a lowering of the level in the water in said heater said pump is automatically cut out of operation, a return overflow pipe from said reservoir to the heater whereby excess water admitted to the reservoir may be discharged, and means operated automatically by an overflow from said reservoir back to said heater to close said inlet water valve.

4. In a water heating system, a water heater, an inlet valve controlling the flow of cold water thereinto, thermostatic means mounted within said heater and controlling said valve to vary the opening thereof proportionately to maintain the temperature of the outflowing water at or above a predetermined minimum degree, a reservoir to receive the heated water, a connection between said reservoir and said heater adapted to be opened to permit a flow to take place from said reservoir when an excess quantity of water flows into said reservoir, and means operated automatically by said excess flow to close said inlet valve of the water heater.

5. In a water heating system, a water heater, inlets and outlets for steam therein, inlets and outlets for water, a water valve for controlling the flow of inlet water to said heater, thermostatic means associated with the heater controlling the opening of said valve to vary the quantity of inlet water to prevent the temperature of the outlet water from falling below a certain minimum degree, a reservoir to receive the heated water from said heater, means transferring the heated water to said reservoir, a normally closed overflow pipe from said reservoir to said heater, automatically acting mechanism to effect opening of said pipe between said reservoir and heater when an excess of water is admitted to the reservoir, and means acting automatically to close the inlet water valve to said heater during a flow from the reservoir to the heater.

6. In a device of the class described, a heater, inlets and outlets for steam therein, an inlet and outlet for water in said heater, a valve controlling the flow through the water inlet to said heater, thermostatic means associated with said heater for controlling the opening of said valve to limit the quantity of inlet water to insure the temperature of the outlet water at or above a certain minimum degree, a reservoir, means to transfer the water from said heater to said reservoir, piping connections between said reservoir and said heater to permit an excess of water admitted to said reservoir to return to said heater, a valve normally closing said piping connections, automatic means for operating said valve to open the same through an excess of water admitted into said reservoir, and automatically acting means to close said inlet valve for water to the heater during a return flow of water from the reservoir to the heater.

7. In a device of the class described, a water heater, a reservoir, means pumping the water from the heater to said reservoir, a normally closed pipe connection between the reservoir and said heater, mechanism acting automatically to open said pipe connection to permit a flow from the reservoir to the heater when an excess of water is admitted to the reservoir, a valve for controlling the flow of cold water into said heater, thermostatic means for controlling said valve, and mechanism to close said valve operated automatically by the flow of water from the reservoir to said heater.

8. In a device of the class described, a water heater, a reservoir connected therewith and adapted to receive the heated water therefrom, a normally closed connection between said reservoir and said heater, mechanisms acting to automatically open the same when the level in the reservoir rises beyond a predetermined amount to permit a flow to take place from the reservoir to the heater, a valve for the inlet to said water heater, and means acting automatically to close the same when a return flow of water takes place from the reservoir to the heater.

In testimony whereof I have hereunto subscribed my name in the presence of two subscribing witnesses.

OBIE J. DILLIN.

Witnesses:
CHARLES W. HILLS, Jr.,
FRANK K. HUDSON.